(12) United States Patent
Dallum et al.

(10) Patent No.: US 8,160,118 B2
(45) Date of Patent: Apr. 17, 2012

(54) UWB DUAL BURST TRANSMIT DRIVER

(75) Inventors: Gregory E. Dallum, Livermore, CA (US); Garth C. Pratt, Discovery Bay, CA (US); Peter C. Haugen, Livermore, CA (US); James M. Zumstein, Livermore, CA (US); Mark L. Vigars, Livermore, CA (US); Carlos E. Romero, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 305 days.

(21) Appl. No.: 12/641,711

(22) Filed: Dec. 18, 2009

(65) Prior Publication Data

US 2010/0166104 A1 Jul. 1, 2010

Related U.S. Application Data

(60) Provisional application No. 61/139,466, filed on Dec. 19, 2008.

(51) Int. Cl.
  *H04B 1/69* (2006.01)
  *H04B 1/707* (2006.01)
  *H04B 1/713* (2006.01)

(52) U.S. Cl. ....... 375/130; 375/295; 375/259; 375/140; 375/146; 330/172; 330/173

(58) Field of Classification Search ............... 375/130, 375/295, 259, 140, 146; 330/172, 173
See application file for complete search history.

(56) References Cited

U.S. PATENT DOCUMENTS

| | | | | |
|---|---|---|---|---|
| 6,937,667 | B1* | 8/2005 | Fullerton et al. | 375/295 |
| 7,792,229 | B2* | 9/2010 | Sanada et al. | 375/354 |
| 2004/0087291 | A1* | 5/2004 | Wada | 455/216 |
| 2005/0095980 | A1* | 5/2005 | Chang | 455/3.02 |
| 2005/0117658 | A1* | 6/2005 | Jun | 375/295 |
| 2006/0291537 | A1* | 12/2006 | Fullerton et al. | 375/145 |
| 2011/0013673 | A1* | 1/2011 | Dallum et al. | 375/146 |

* cited by examiner

*Primary Examiner* — Phuong Phu
(74) *Attorney, Agent, or Firm* — John P. Wooldridge; Henry Sartorio

(57) ABSTRACT

A dual burst transmitter for ultra-wideband (UWB) communication systems generates a pair of precisely spaced RF bursts from a single trigger event. An input trigger pulse produces two oscillator trigger pulses, an initial pulse and a delayed pulse, in a dual trigger generator. The two oscillator trigger pulses drive a gated RF burst (power output) oscillator. A bias driver circuit gates the RF output oscillator on and off and sets the RF burst packet width. The bias driver also level shifts the drive signal to the level that is required for the RF output device.

24 Claims, 19 Drawing Sheets

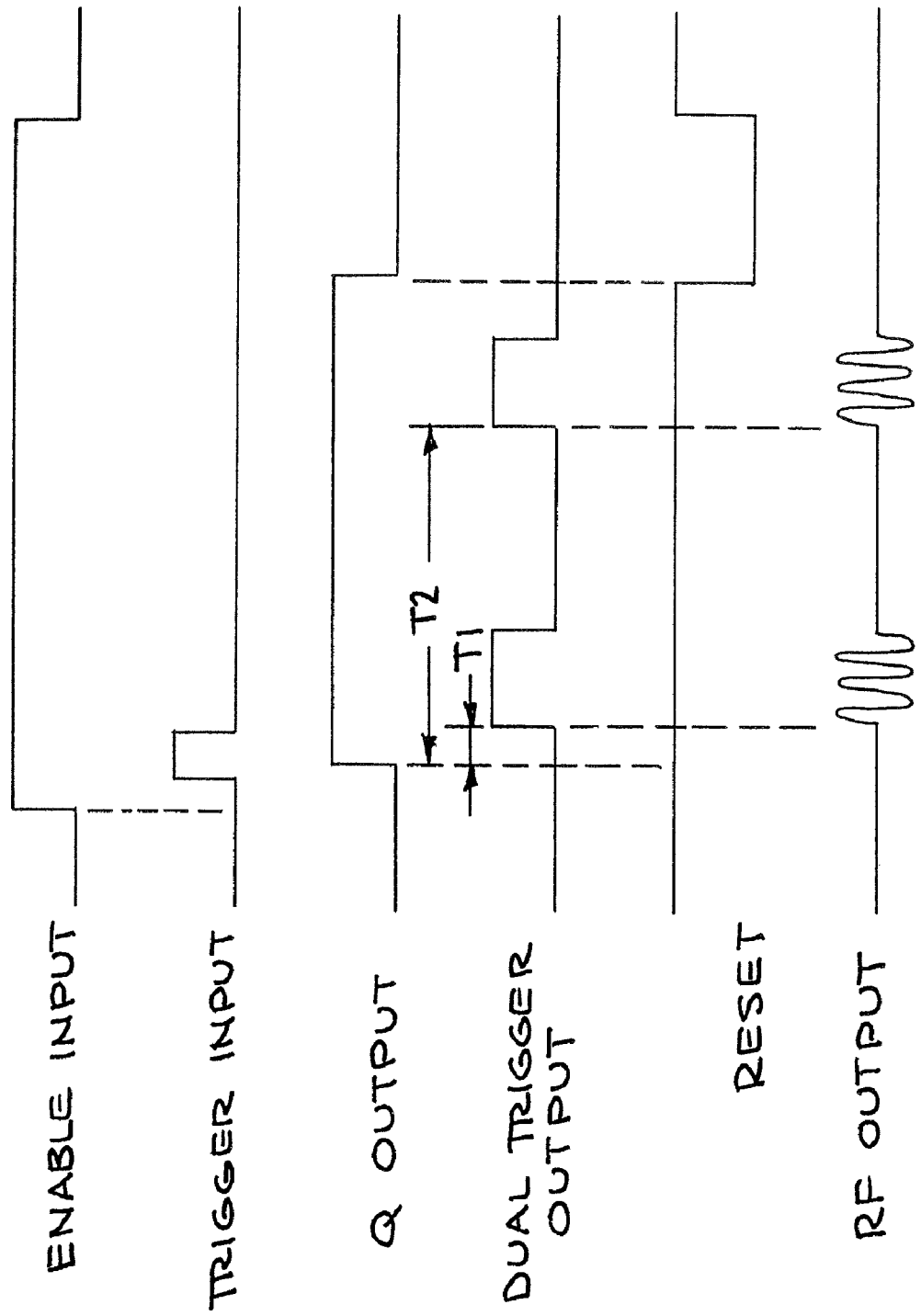

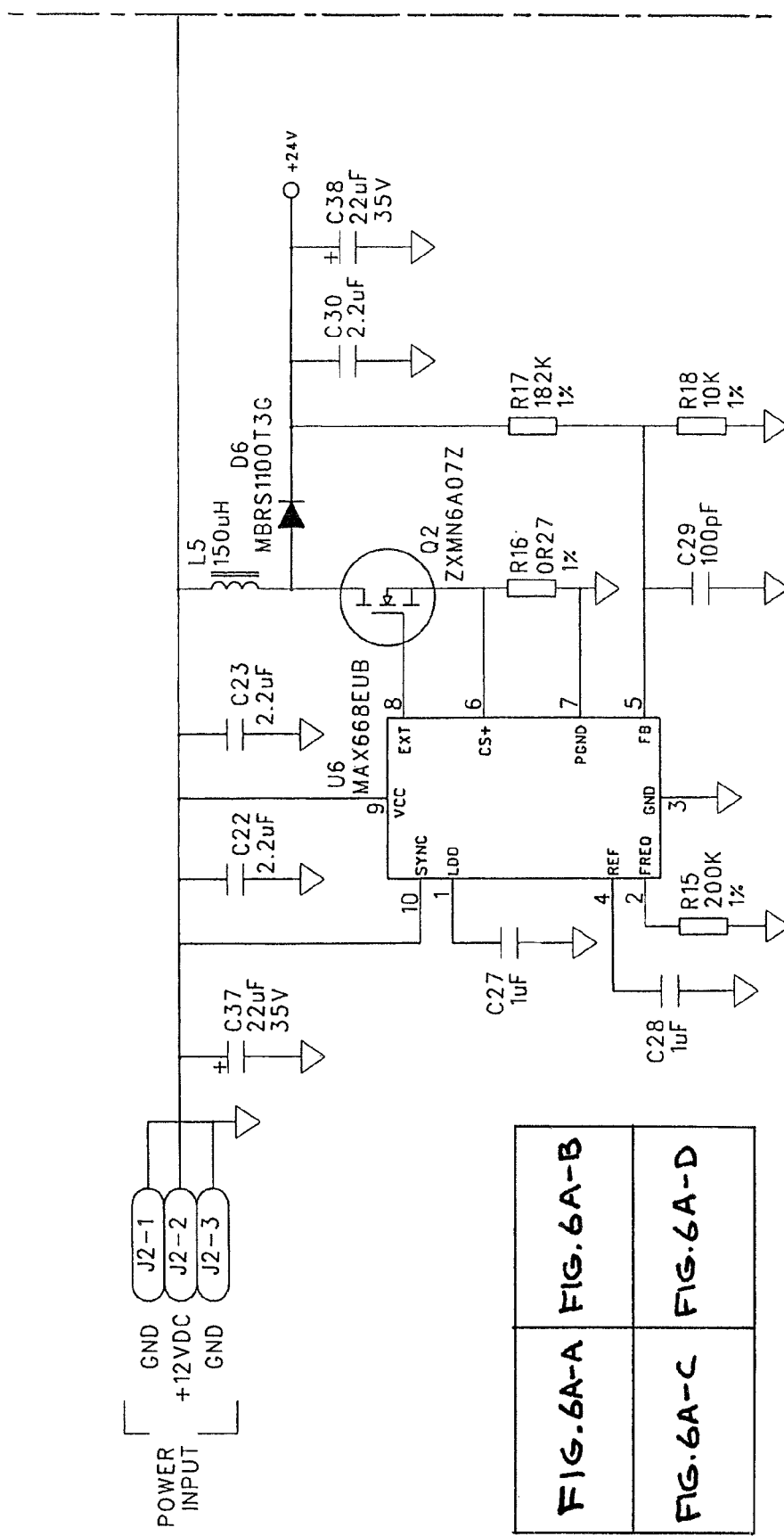
FIG. 6A-A

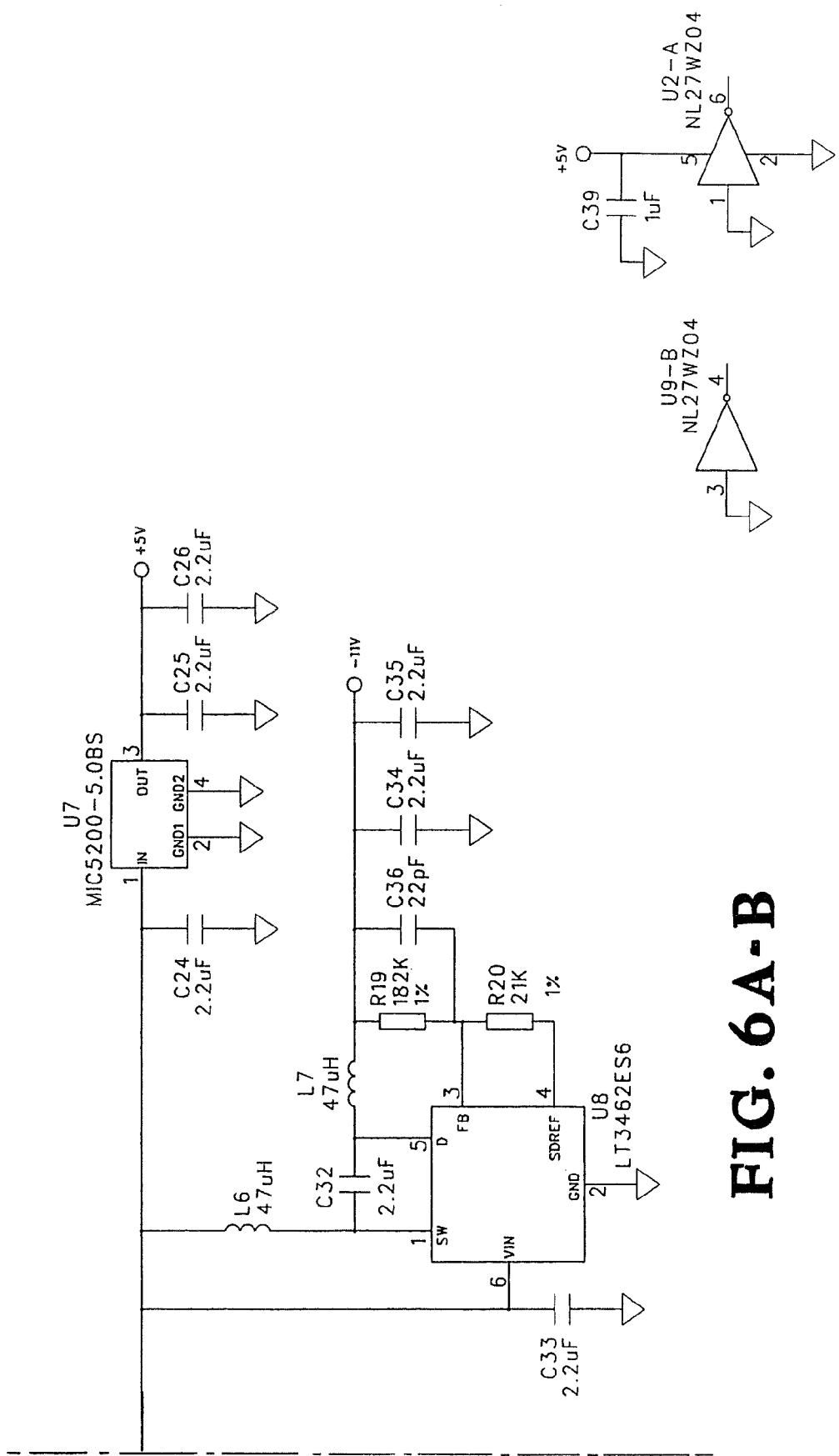
FIG. 6A-B

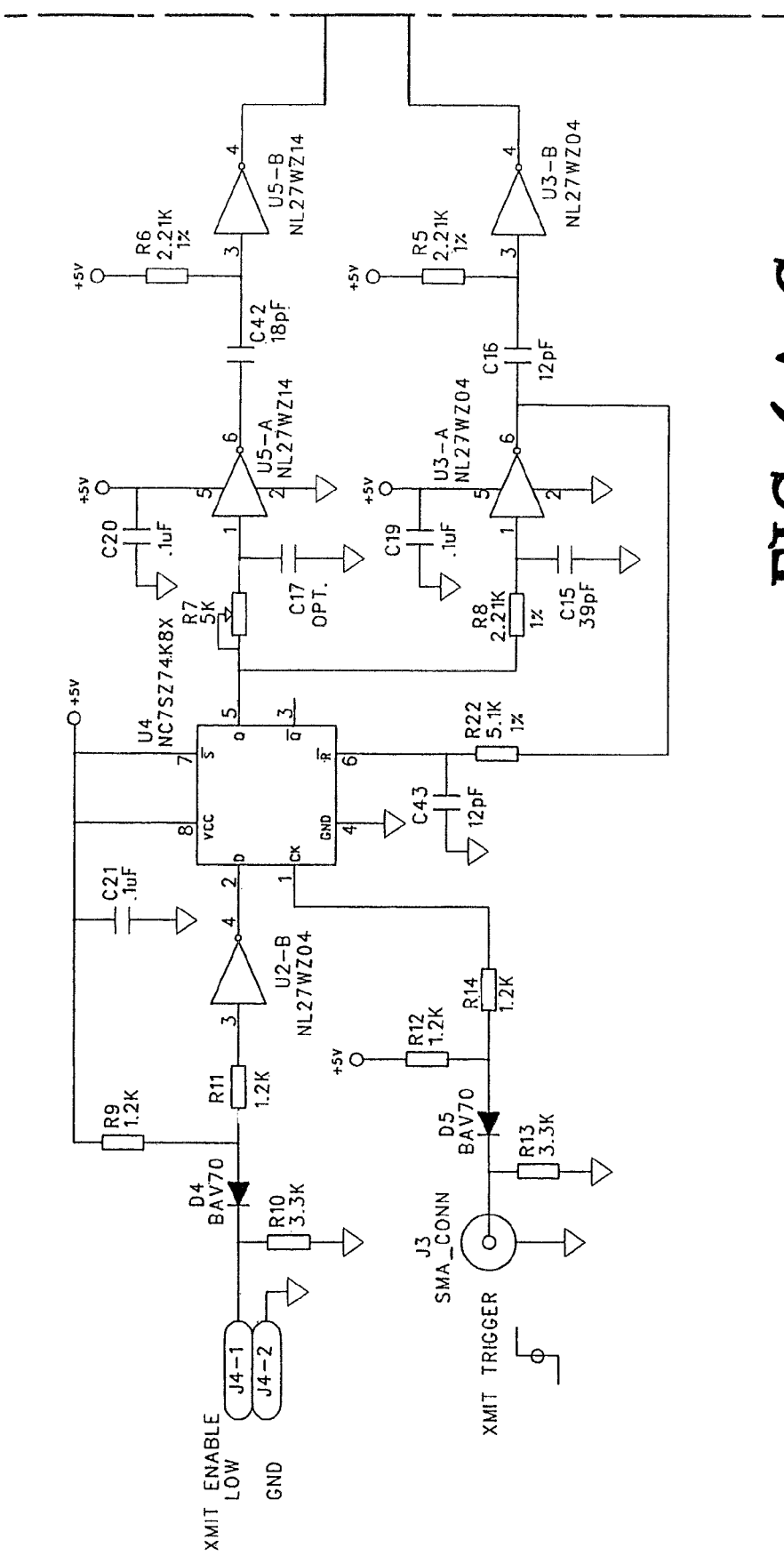
FIG. 6A-C

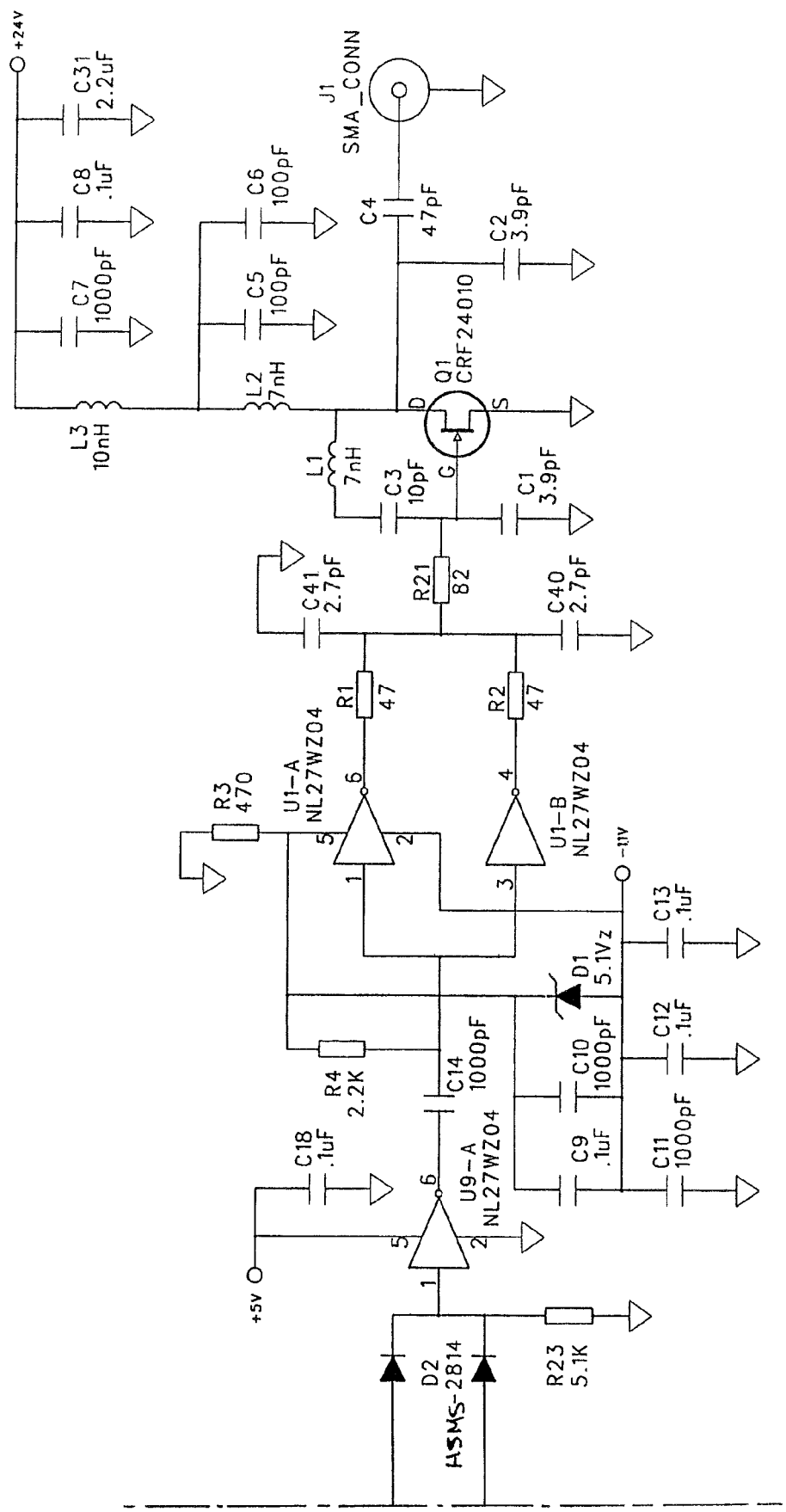
FIG. 6A-D

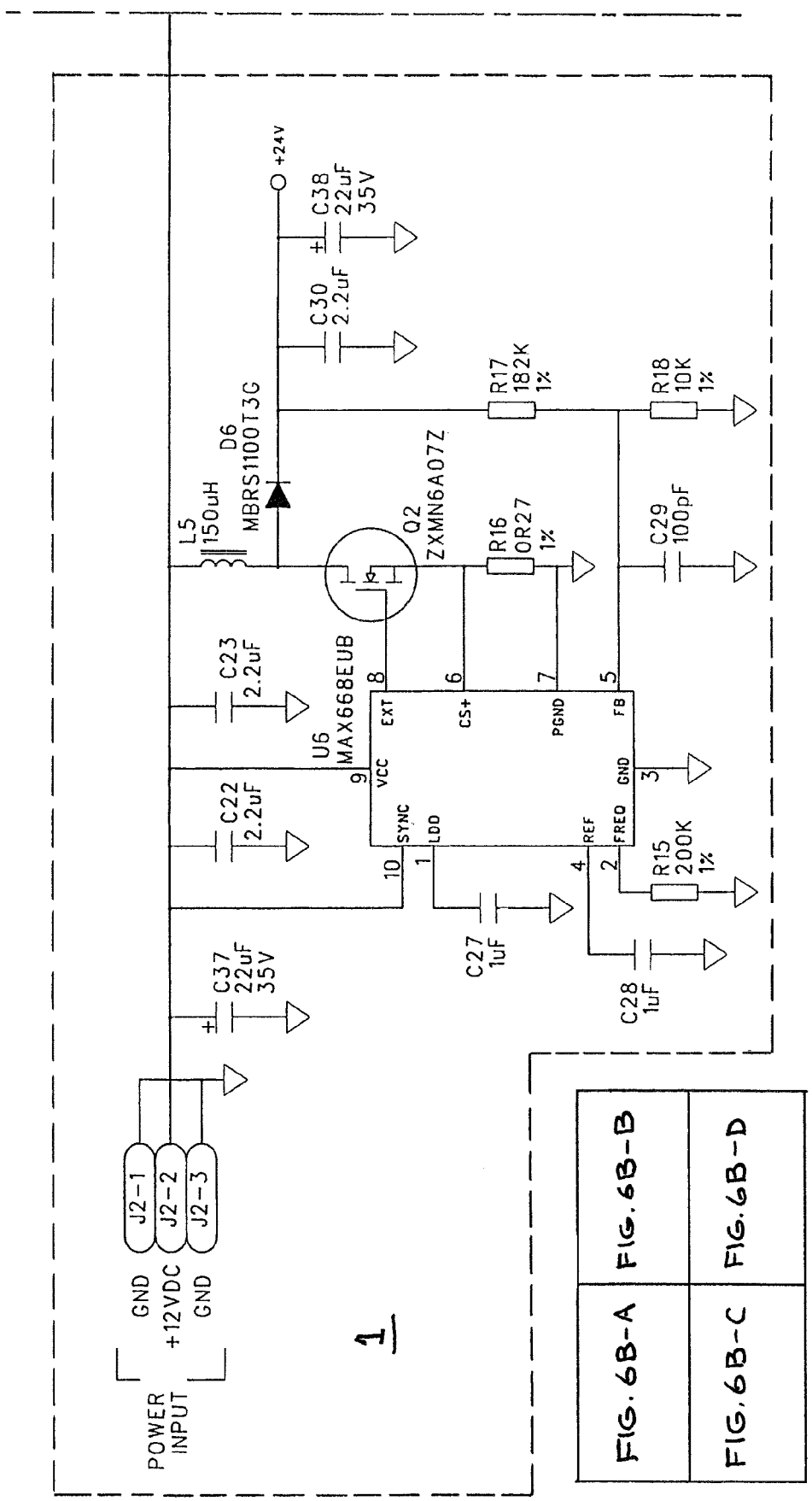
FIG. 6B-A

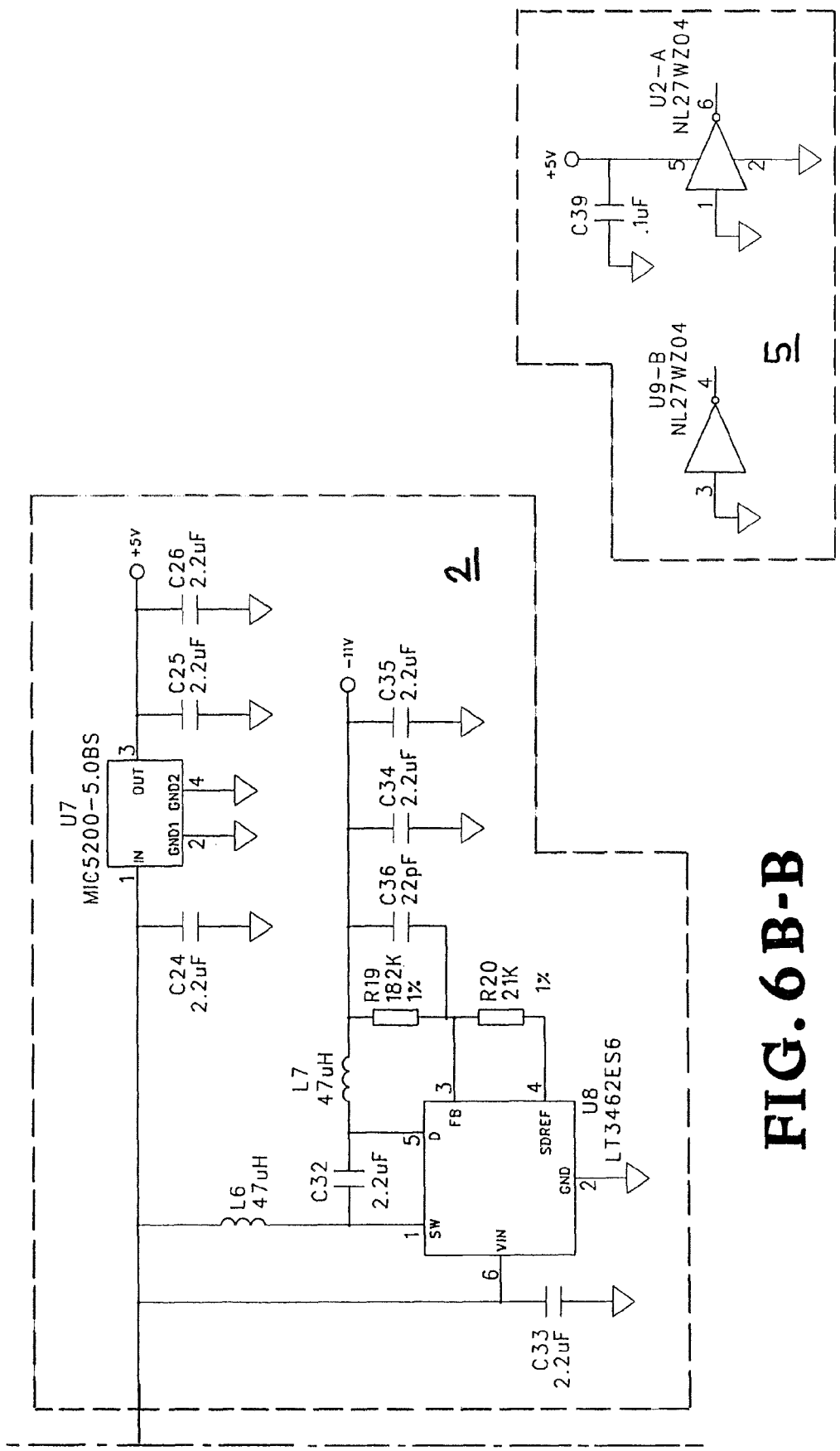
FIG. 6B-B

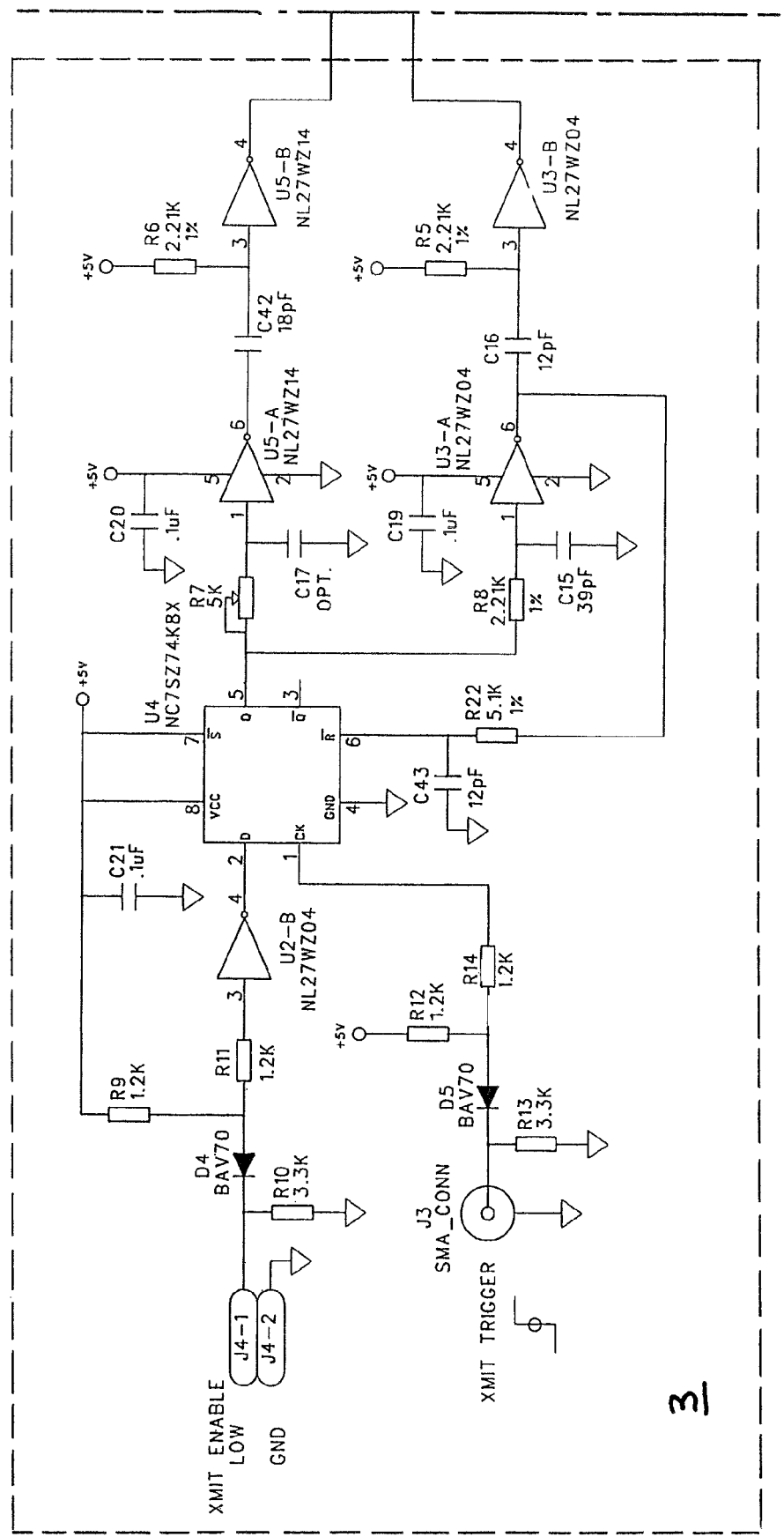
FIG. 6B-C

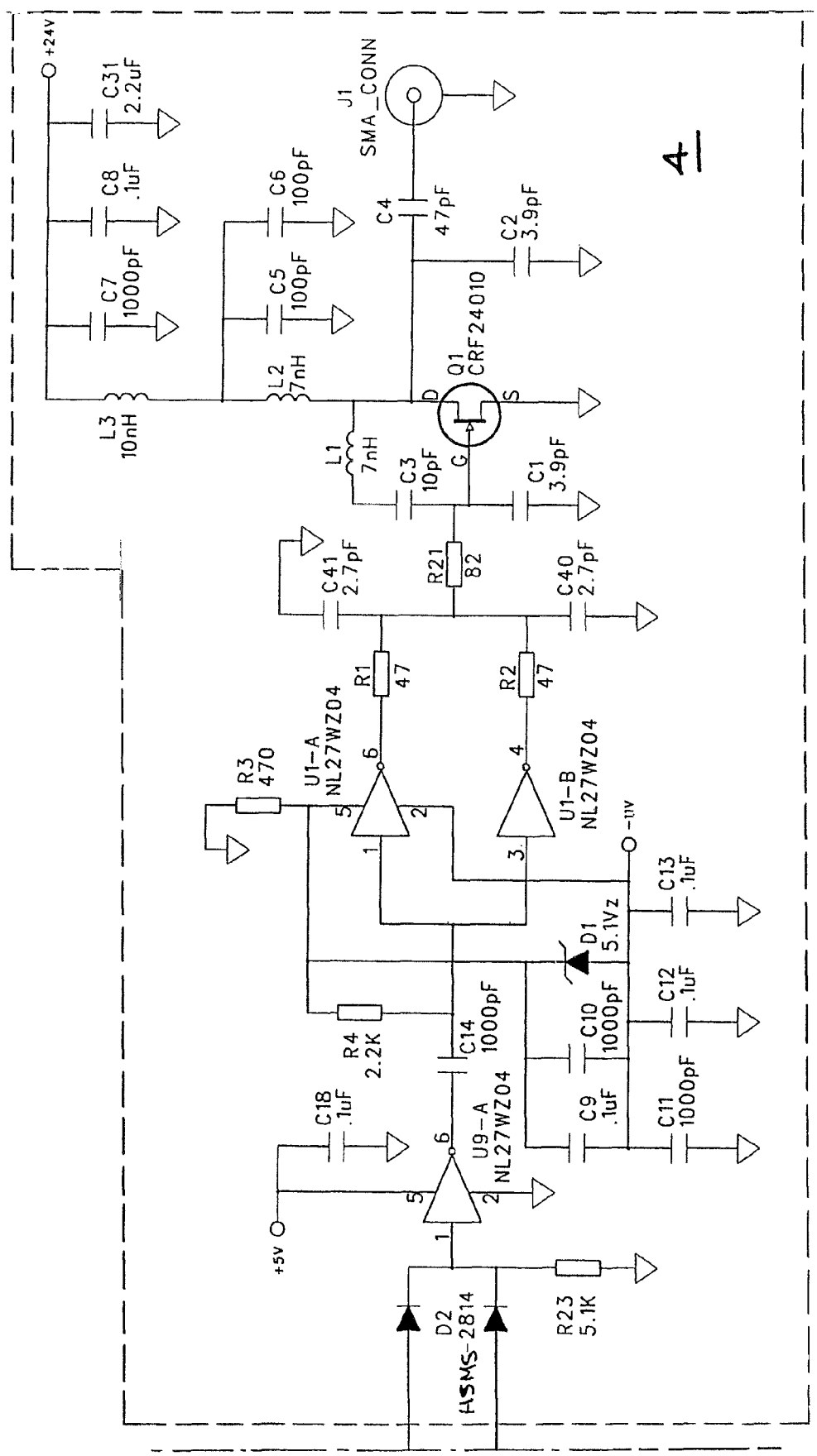
FIG. 6B-D

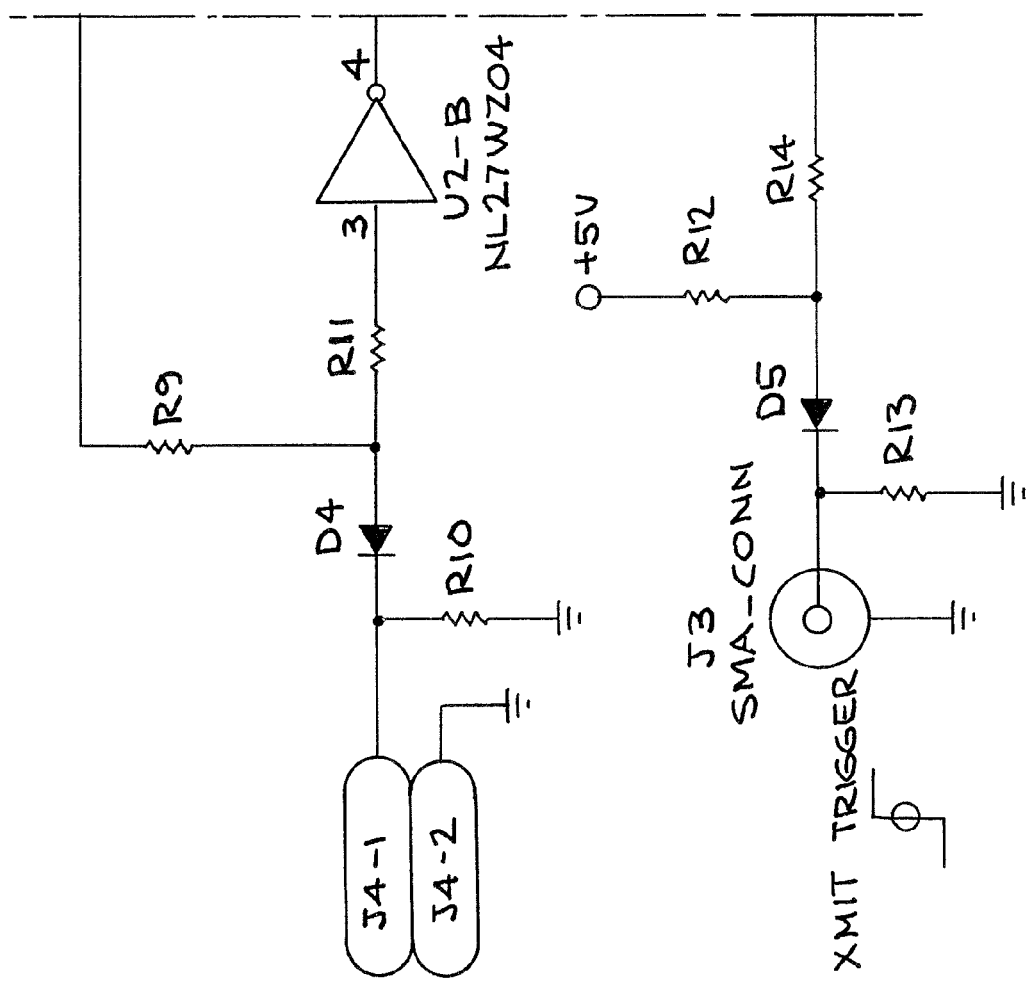
FIG. 6E-A

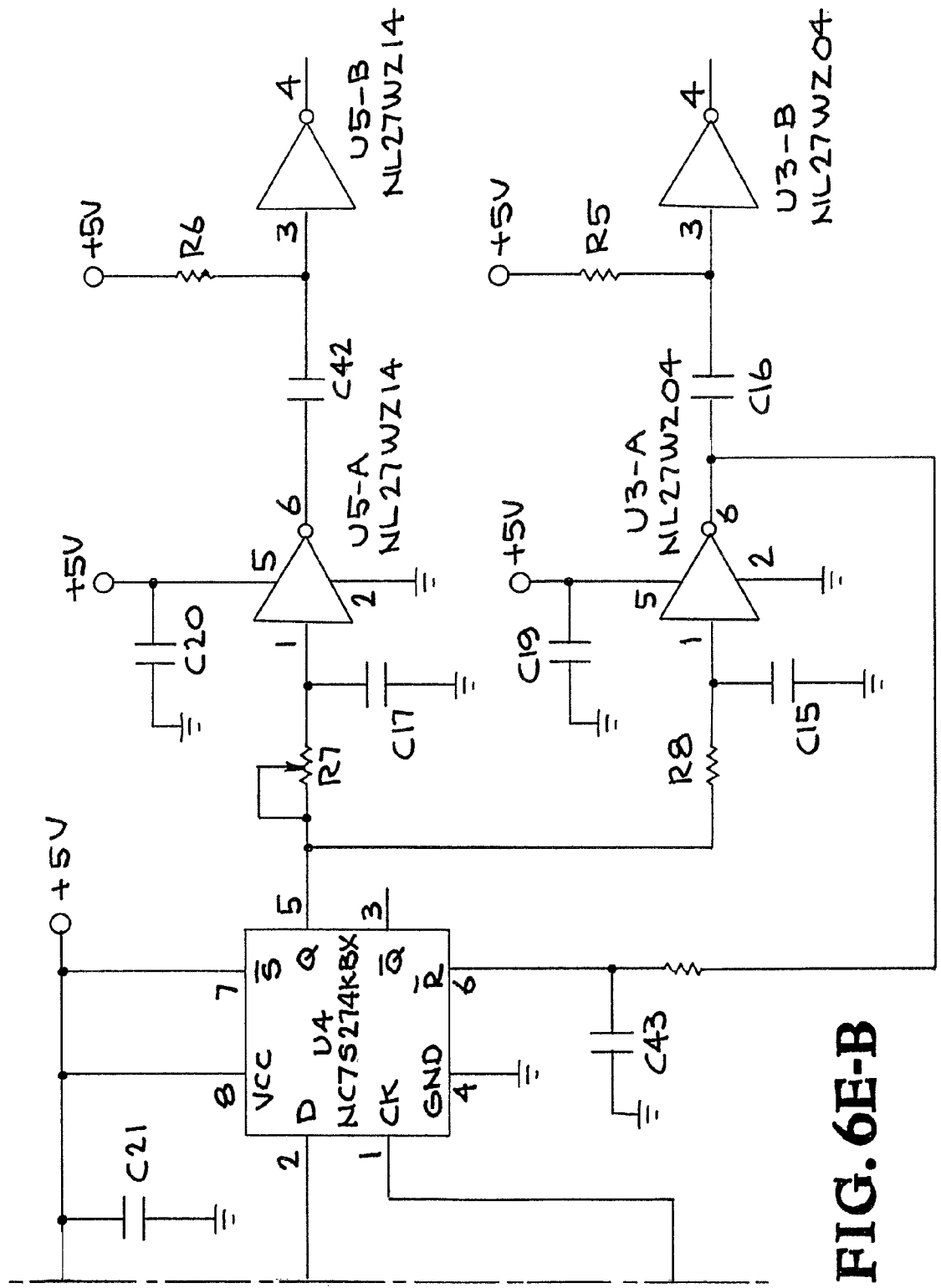
FIG. 6E-B

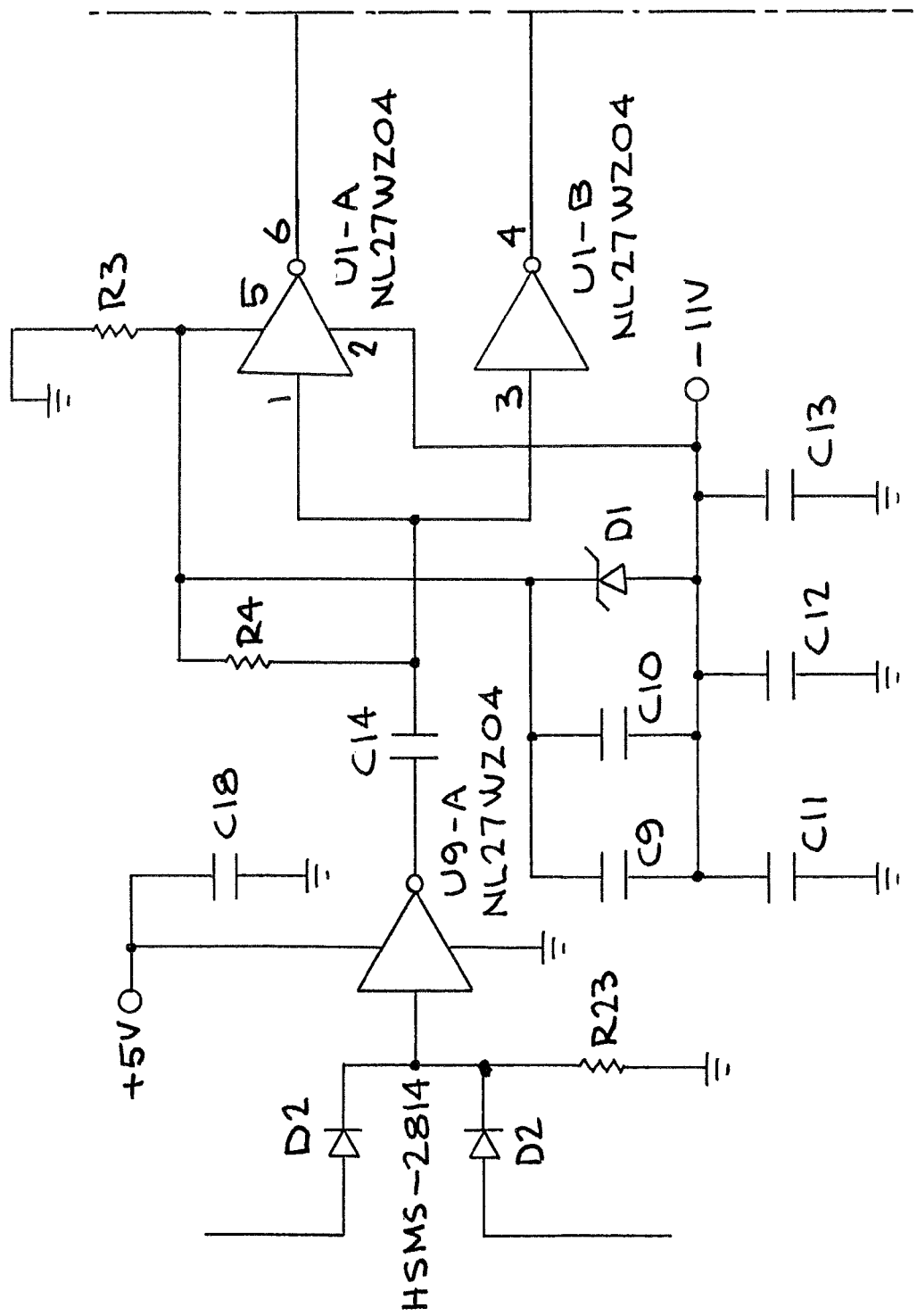
FIG. 6F-A

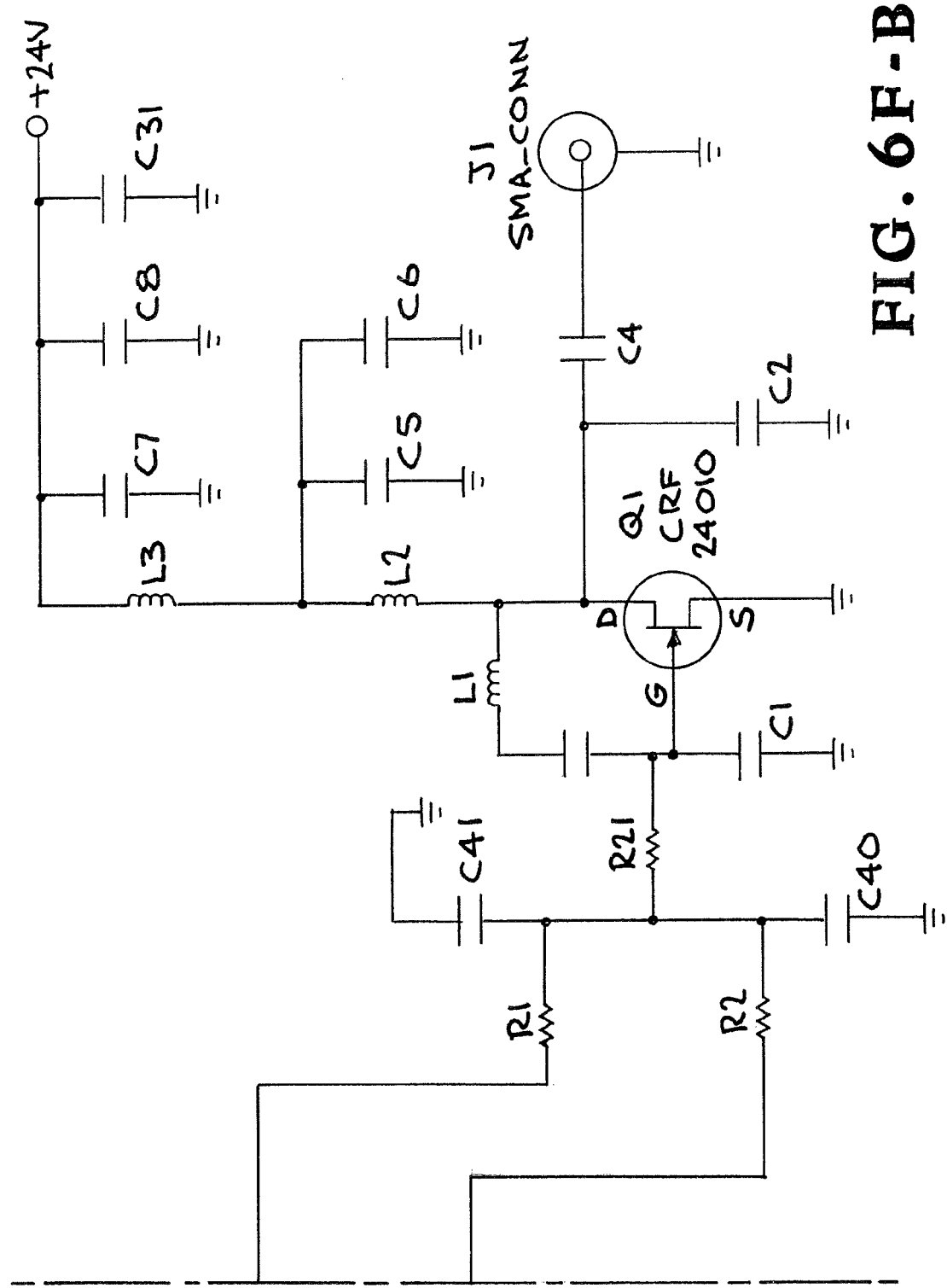
FIG. 6F-B

UWB DUAL BURST TRANSMIT DRIVER

RELATED APPLICATIONS

This application claims priority from Provisional Application Ser. No. 61/139,466 filed Dec. 19, 2008, which is herein incorporated by reference.

GOVERNMENT RIGHTS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to ultra-wideband communications, and more particularly to ultra-wideband (UWB) transmitters.

2. Description of Related Art

Ultra-wideband (UWB) wireless communication is based on the transmission of data in extremely short, e.g. 50-1000 ps, pulses spread out over a broad frequency range or bandwidth, typically several GHz, of the electromagnetic spectrum. Large data bursts, e.g. hundreds of Gb/s, are possible because the data are carried simultaneously at a wide range of frequencies across the electromagnetic spectrum.

UWB communications offers many advantages. UWB signals are more difficult to detect than narrowband (essentially single frequency) signals. The combination of broad spectrum, low power, and extremely short pulses also cause much less interference with other devices than do conventional narrowband wireless systems. Also, UWB is much more resistant to electrical interference from other devices than other wireless technology. Thus, UWB's data capacity, speed, low power requirements, and resistance to interference make it attractive as a communications technology.

UWB pulses spread the transmitted energy over many frequencies, over a band of typically several GHz, as opposed to traditional narrowband, which generally operates as a continuous wave at a specific frequency and covers a limited band of about 30 KHz. Cellular phones operate in the wideband, which covers about 5 MHz. UWB bandwidth provides high capacity, resistance to jamming, and low probability of detection. Thus UWB provides an attractive alternative to the other communications technologies. At present, the FCC restricts commercial UWB systems, but Government use is less restricted. UWB appears very promising for the future.

One type of receiver used in UWB communications systems is a delay and multiply receiver in which a received pulse is multiplied by a delayed prior received pulse to increase the magnitude. This requires a precise spacing between the transmitted pulses so that the delay can be chosen so that the presently received pulses are coincident with the delayed previously received pulses. It is also required that the pulses be in phase so that when they are multiplied they do not cancel out. At a minimum, a pair of pulses is required.

Thus, it is desirable to provide an UWB transmitter capable of generating a pair of RF bursts with precise spacing between the bursts.

It is also desirable to provide an UWB transmitter capable of generating a precisely spaced pair of RF bursts where each burst starts up at the same phase as the other bursts.

BRIEF SUMMARY OF THE INVENTION

An aspect of the invention is an ultra-wideband (UWB) dual burst transmitter, formed of a trigger pulse initiation circuit actuated by a single input trigger pulse; an initial trigger pulse generator connected to the trigger pulse initiation circuit to generate a first trigger pulse; a delayed trigger pulse generator connected to the trigger pulse initiation circuit to generate a second trigger pulse at a selected delay from the first trigger pulse; a bias driver connected to the initial and delayed trigger pulse generators; and a RF burst oscillator connected to the bias driver and actuated thereby in response to the first and second trigger pulses to generate a pair of RF bursts separated by the selected delay.

Another aspect of the invention is a method of generating a precisely spaced pair of ultra-wideband (UWB) RF bursts, each starting with the same phase, from a single input trigger pulse, by generating an actuation signal from the input trigger pulse; passing the actuation signal through two trigger pulse generating paths to produce an initial trigger pulse and a delayed trigger pulse separated by a selected delay from the initial trigger pulse; and driving an oscillator with the initial and delayed trigger pulses to produce a spaced pair of RF bursts, the RF bursts being separated by the selected delay.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 5 is a timing diagram for the UWB dual burst transmitter of FIG. 1.

FIGS. 6A-6G show exemplary schematics of an embodiment of the present invention.

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, without departing from the basic concepts as disclosed herein.

The invention is a dual burst transmitter that is used in ultra-wideband (UWB) communication systems. The circuit generates two RF bursts from a single trigger event. Each RF burst packet is about 10 ns in width. An input trigger pulse produces two oscillator trigger pulses, an initial pulse and a delayed pulse, in a dual trigger generator. The two oscillator trigger pulses drive a gated. RF burst oscillator (or RF power output oscillator). The output RF oscillator starts with the same phase and amplitude characteristics when triggered by each pulse. The delay between the two trigger pulses sets the spacing of the RF burst packets. The same spacing is built into a receiver section where the pair of RF bursts are mixed or multiplied together with a known phase characteristic to increase the effective receiver sensitivity. Fixed component values around the RF oscillator set the frequency of the RF transmitter output. A bias driver circuit gates the RF output oscillator on and off and sets the RF burst packet width. The bias driver also level shifts the drive signal to the level that is required for the RF output device.

In the UWB dual burst transmitter of the invention, a dual trigger generator produces a precisely spaced pair of oscillator trigger pulses, one delayed with respect to the other. The pair of trigger pulses drive a RF power output or RF burst oscillator, which produces a spaced pair of RF bursts of high frequency, i.e. GHz. The two trigger pulses pass through a bias driver to the RF burst oscillator. The bias driver conditions, e.g. level shifts, the signals (trigger pulses) from the dual trigger generator for input into the RF burst oscillator, and also controls the length of each RF burst. The RF power output oscillator produces a RF burst on each of the two trigger pulses. An input trigger pulse actuates a timing circuit that produces the pair of oscillator trigger pulses. The RF power output oscillator then produces a pair of RF bursts in response to the trigger pulses. The RF frequency is determined by the RF burst oscillator.

Figure 1:
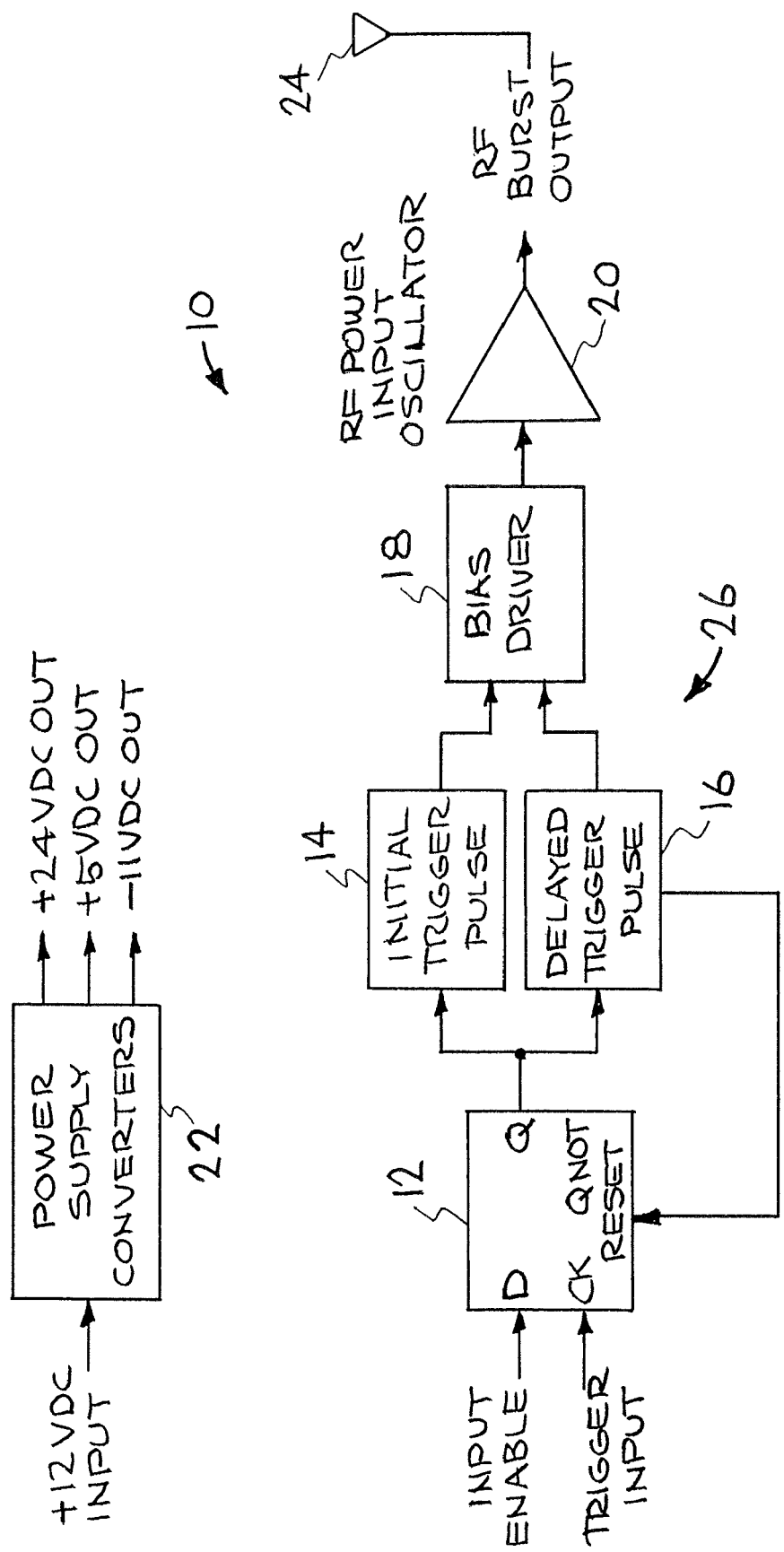
FIG. 1 is a schematic block diagram of an UWB dual burst transmitter of the invention.

FIG. 1 is a block diagram of an ultra-wideband (UWB) dual burst transmitter 10 of the invention. Transmitter 10 is comprised of a trigger input flip-flop 12, an initial (nondelayed) trigger pulse generator 14, a delayed trigger pulse generator 16, an output oscillator bias driver 18, and finally a RF burst or power output oscillator 20. Trigger input flip-flop 12 forms a trigger pulse initiation circuit. Flip-flop 12 and trigger pulse generators 14, 16 form a timing circuit to produce the two oscillator trigger pulses. The two parallel pulse generators 14, 16 form a dual trigger generator 26. There are also power supply converters 22 used to provide the correct bias and operating voltages for the circuits. RF power output oscillator 20 is coupled to a transmit antenna 24.

Flip-flop 12 is a "D" type flip-flop having an input enable at its D input and a trigger input at its clock (CK) input. The Q output of flip-flop 12 is connected to initial trigger pulse generator 14 and delayed trigger pulse generator 16. The delayed trigger pulse generator 16 is also connected back to the reset input of flip-flop 12.

Figure 2:
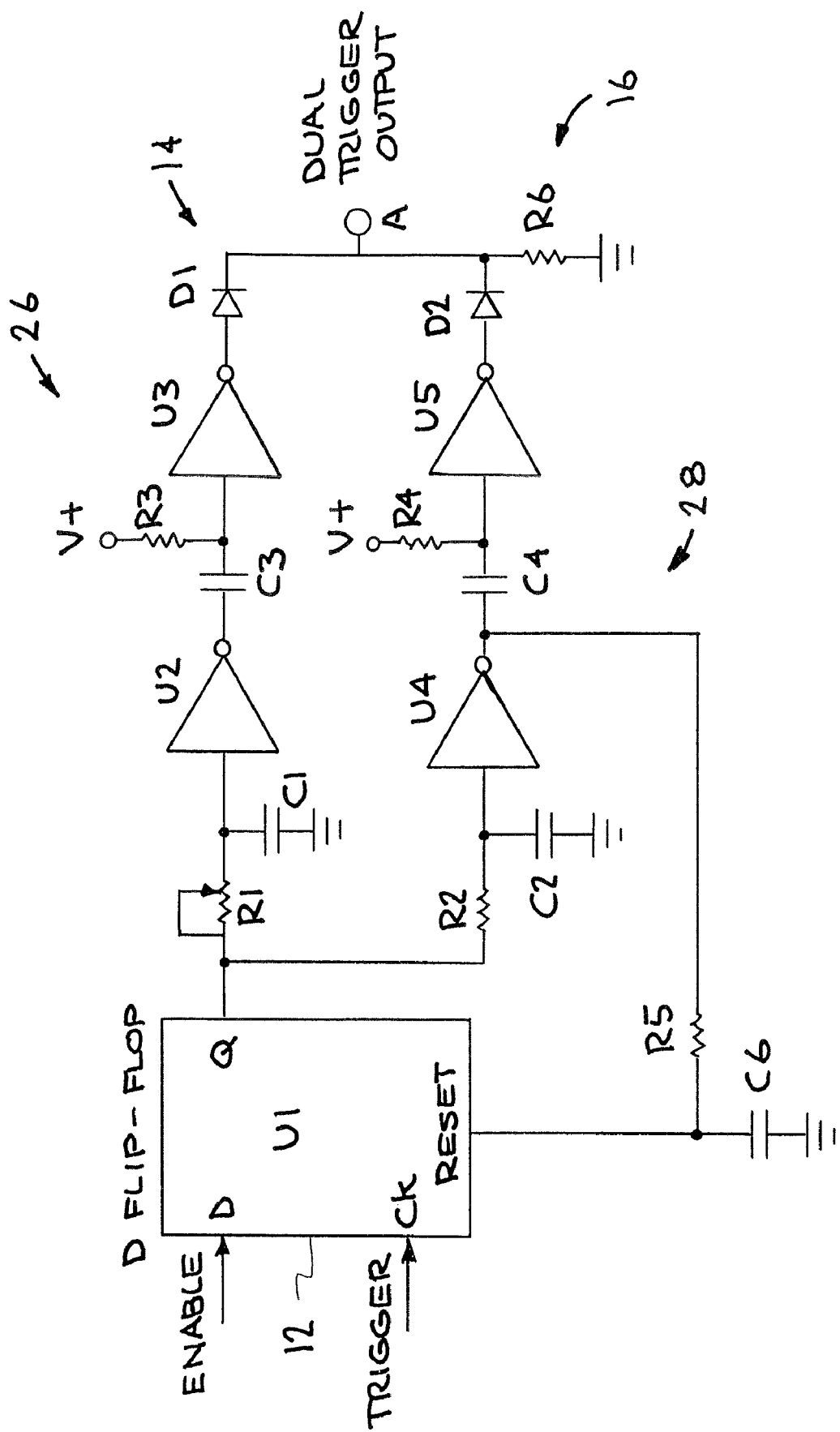
FIG. 2 is a circuit diagram of an embodiment of the dual trigger generator section of the UWB dual burst transmitter of FIG. 1.

FIG. 2 is a more detailed circuit diagram of an embodiment of the dual trigger generator section, which includes the flip-flop 12, initial trigger pulse generator 14, and delayed trigger pulse generator 16. Initial trigger pulse generator 14 is made up of a variable resistor R1, capacitor C1, inverter U2, capacitor C3, resistor R3, inverter U3, and diode D1. R1 is connected from the Q output of flip-flop 12 to the input of U2. C1 is connected from the input of U2 to ground. The output of U2 is connected through C3 to the input of U3. The input of U3 is also connected through R3 to a voltage source V+. C3 and R3 form a differentiator. The output of U3 is connected through D1 to dual trigger output node A, which is connected through a resistor R6 to ground.

Delayed trigger pulse generator 16 is made up of a resistor R2, capacitor C2, inverter U4, capacitor C4, resistor R4, inverter U5, and diode D2. R2 is connected from the Q output of flip-flop 12 to the input of U4. C2 is connected from the input of U4 to ground. The output of U4 is connected through C4 to the input of U5. The input of U5 is also connected through R4 to a voltage source V+. C4 and R4 form a differentiator. The output of U5 is connected through D2 to dual trigger output node A. The inverters are typically CMOS inverters.

The "D" type flip-flop 12 latches the input trigger signal on its rising edge. The Q output of the flip-flop 12 then goes to a logic high level. The flip-flop Q output stays high until the flip-flop reset line is brought to a logic low level (by delayed trigger pulse generator 16, as described below). When the flip-flop Q output goes to a high level, the dual oscillator triggers are initiated.

The trigger pulse through U2 is delayed slightly by the RC time constant of R1, C1. This slight delay is defined as T1. The trigger pulse through U4 is delayed by the RC time constant of R2, C2. This delay is defined as T2. The time constant associated with R1, C1 is small compared to the time constant of R2, C2 so that delay T2 is much longer than delay T1. By adjusting R1, the circuit delay may be fine tuned relative to the delayed trigger path. C1 can be a discrete component or just the input capacitance associated with a CMOS gate used for U2. The output of U2 is differentiated by C3 and R3 and the result is a pulse out of U3 that is narrower than the delay between the two pulses. The output of U4 is similarly differentiated by C4 and R4. The output pulse at U5 is delayed relative to the output pulse from U3. The pulse width is set by the differentiated signal at the input to U5, which is usually the same as the input to U3. The two triggers are diode combined by D1 and D2 and output at node "A" from which they are sent to the bias driver circuit 18 shown in FIG. 3. The trigger pulse from U3 is the first (essentially nondelayed) trigger pulse and the trigger pulse from U5 is the second (delayed) trigger pulse of the pair of trigger pulses.

The reset portion 28 of the circuit shown in FIG. 2 is comprised of resistor R2, capacitor C2, and inverter U4 of the delayed trigger pulse generator 16, resistor R6 and capacitor C6. The output of U4 is connected through R6 to the RESET input of flip-flop 12, which is also connected through C6 to ground. The reset portion 28 of the circuit re-arms the flip-flop 12 to accept another input trigger after the delayed second pulse has been generated by delayed trigger pulse generator 16. The time constant of R5 and C6 is longer than the time constant associated with R4 and C4 so that U5 outputs a delayed trigger pulse before U4 resets flip-flop 12.

Once the flip-flop 12 is reset, it can accept a new trigger input. The enable line of the flip-flop 12 allows for external control of the trigger line. The enable line must be high for the input trigger line to function.

Figure 3:
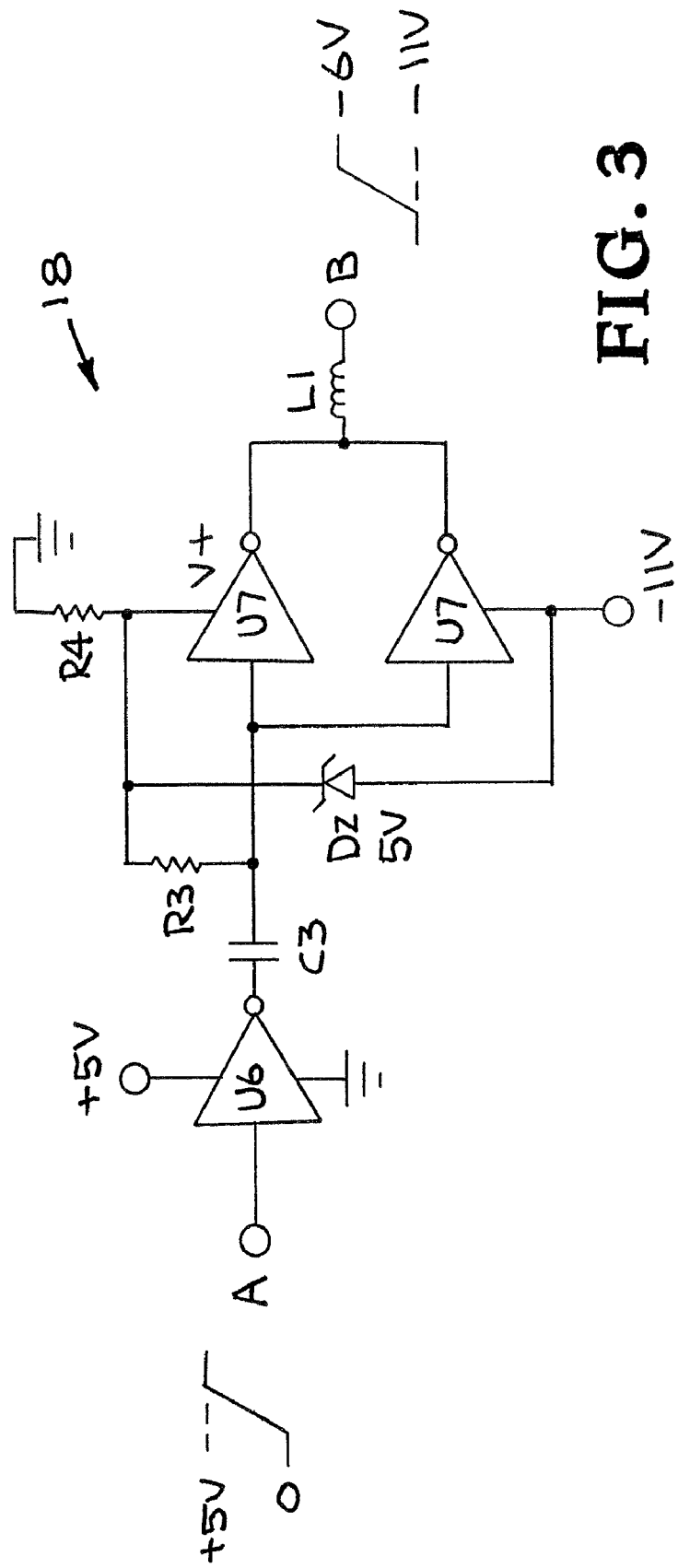
FIG. 3 is a circuit diagram of an embodiment of the bias driver of the UWB dual burst transmitter of FIG. 1.

An embodiment of the bias driver 18 of the UWB transmitter is shown in FIG. 3. Bias driver 18 is made up of an inverter U6, whose output is connected through capacitor C3 to the inputs of a parallel pair of inverters U7, whose outputs are connected through an inductor L1 to the RF power output oscillator 20. The inputs to inverters U7 are connected through resistors R3 and R4 to ground. The V+ input of one inverter U7 is also connected through R4 to ground. The COM input of the other inverter U7 is connected to −11V (from power supply converters 22 of FIG. 1) and also through a 5V zener diode Dz and R4 to ground. C3 and R3 form a differentiator.

The bias driver 18 level shifts drive signal levels for use by an output power transistor in the RF power output oscillator 20. The bias driver 18 also sets the width of the RF output burst. U6 inverts the signal (A) from the gated burst rate oscillator 16. This inverted signal is differentiated by C3 and R3. This differentiated signal is the input signal to the level shifted driver gates U7 and sets the width of the RF output burst. The power supply is level shifted by Dz and R4 to provide the correct gate voltage drive levels to the output power transistor. The logic levels at the output of U7 swing between −11V and −6V. L1 buffers these drive levels and provides a sufficiently high impedance to allow the RF power transistor to oscillate when U7 is at a logic high level.

Figure 4:
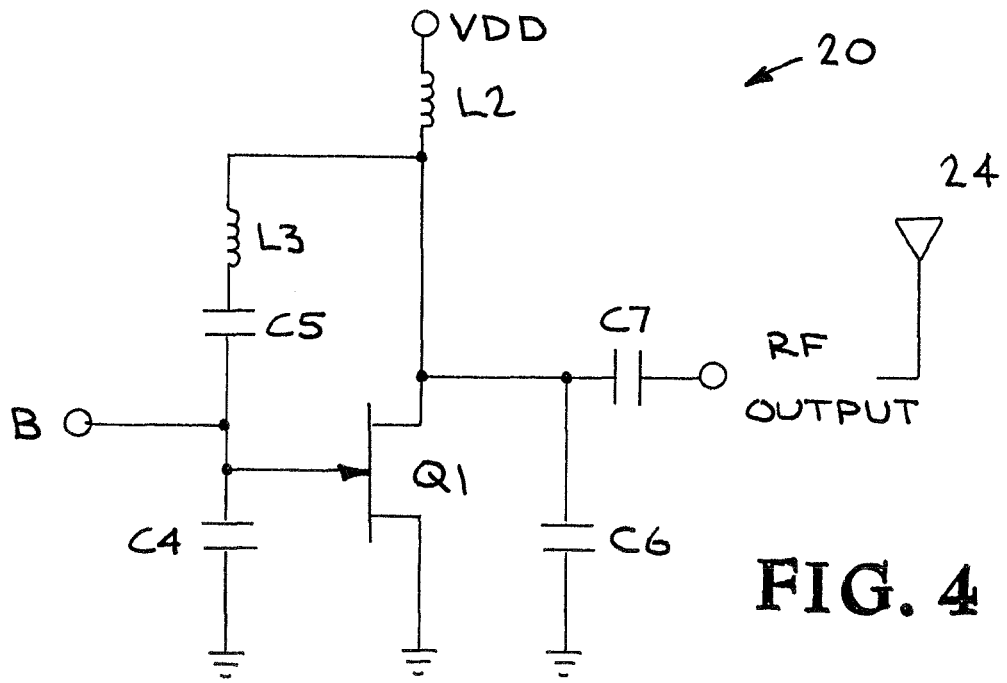
FIG. 4 is a circuit diagram of an embodiment of the RF burst (power output) oscillator of the UWB dual burst transmitter of FIG. 1.
Figure 6G:
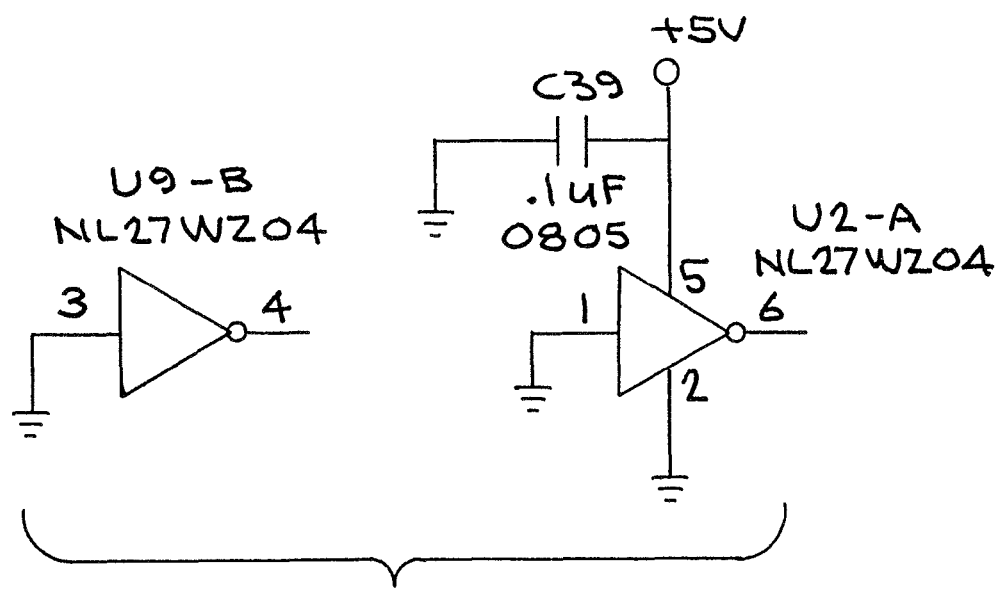
Figure 6C:
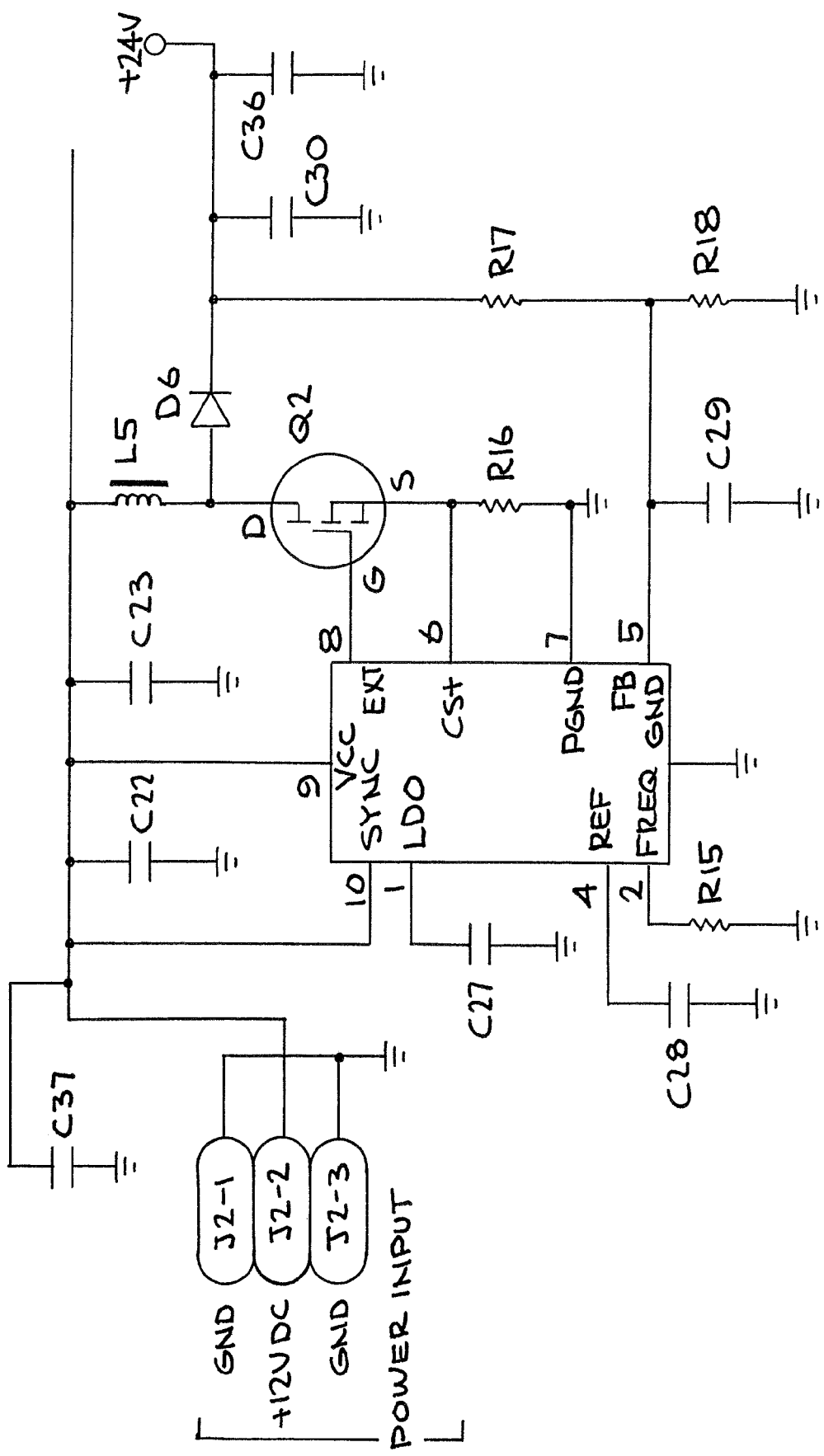
Figure 6D:
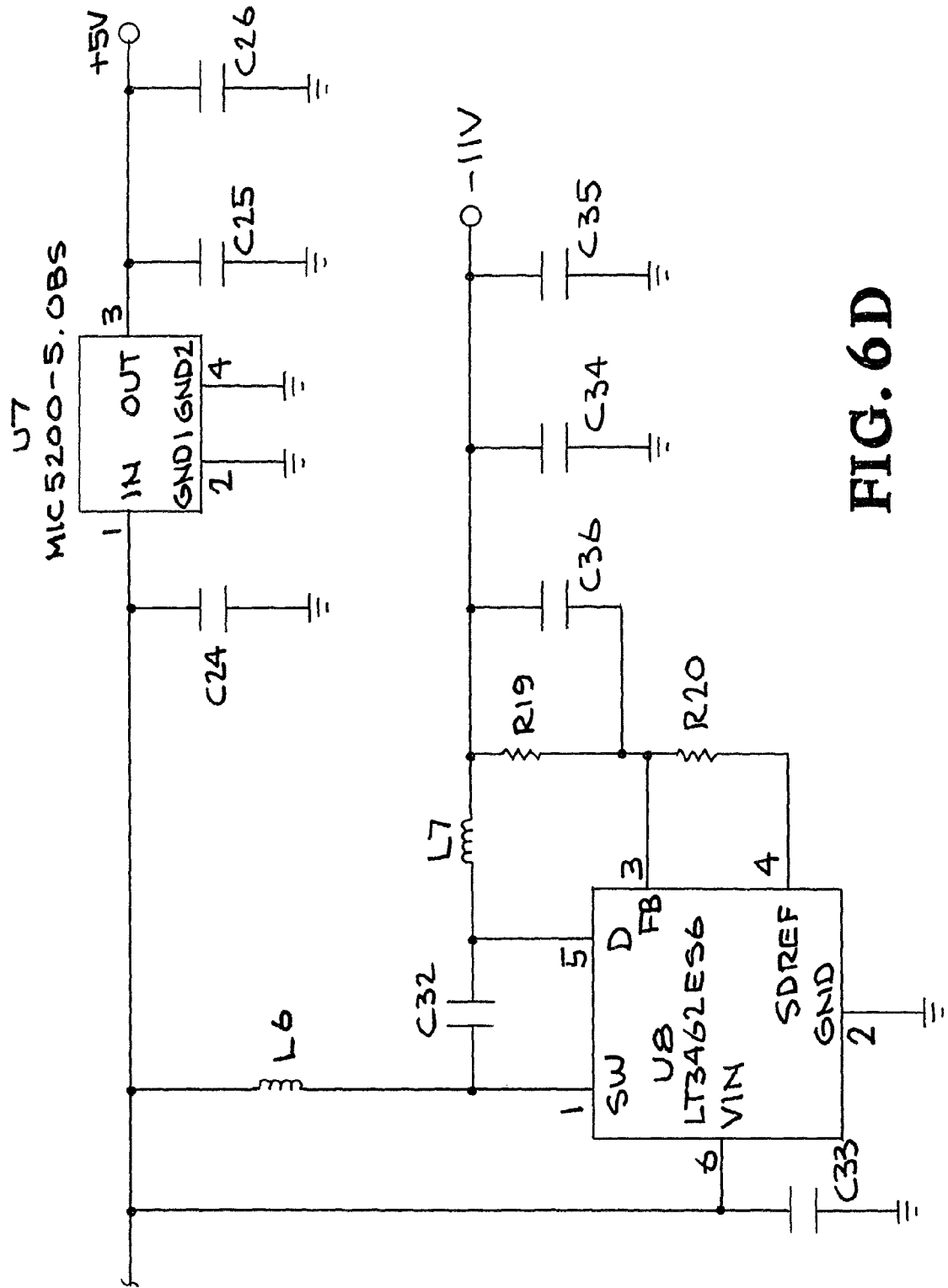

An embodiment of the RF power output oscillator or RF burst oscillator 20 is shown in FIG. 4, and is based on a RF power transistor Q1, which is preferably a MESFET. The signal (B) from bias driver 18 is applied to the gate of Q1, which is also connected through capacitor C4 to ground, and through series capacitor C5, inductor L3 and inductor L2 to voltage supply VDD. The drain of Q1 is connected to ground, and the source of Q1 is connected through L2 to VDD. The source of Q1 is also connected through capacitor C6 to ground, and through capacitor C7 to the RF output.

The power output oscillator 20 generates the RF output that feeds a transmit antenna 24. An illustrative implementation generates 1.5 GHz bursts that are 10 ns in duration. The output MESFET is powered from a 24 VDC source (VDD) through L2. The oscillator starts with the same phase characteristic when the drive input (B) is brought to the midpoint bias level of the MESFET gate. The output stage is a short burst Clapp oscillator design. The frequency of oscillation is determined by the values of C4, C5, C6, L3 and the internal capacitances of Q1.

FIG. 5 shows the relative timing of the signals for the UWB dual burst transmitter of the invention. The ENABLE INPUT signal must be applied to the D input of the flip-flop 12 for the transmitter 10 to operate. The TRIGGER INPUT signal then produces the Q OUTPUT signal which actuates the nondelayed and delayed trigger pulse generators 14, 16 of dual trigger generator 26, which produce the DUAL TRIGGER OUTPUT signal. This signal has a spaced pair of oscillator trigger pulses, the first starting at T1, and the second at T2. The spacing between the pulses is T2-T1. The reset circuit 28 generates a RESET signal after the second trigger pulse has been produced. The RESET signal causes the Q OUTPUT signal to go low, which allows another trigger input. The leading edges of the two pulses of the DUAL TRIGGER OUTPUT signal result in the two RF OUTPUT bursts. The two bursts of the RF OUTPUT signal always start up in phase, i.e. with the same phase. The spacing of the RF OUTPUT bursts is T2-T1. The length of each RF burst is set by the bias driver 18, and the frequency of the oscillations in each burst is determined by the parameters of the RF burst oscillator 20.

The invention also includes a method of generating a precisely spaced pair of UWB RF bursts, each starting with the same phase, from a single trigger event. From a trigger input signal, dual trigger pulses are generated which are separated by a defined spacing. An actuation signal produced by the input trigger signal passes through two pulse generating paths to produce an initial trigger pulse and a delayed trigger pulse. These two trigger pulses drive an oscillator to produce a pair of RF bursts of high frequency, i.e. GHz. RF bursts are produced by the oscillator on each trigger pulse. The two trigger pulses are conditioned before driving the second oscillator. The RF bursts are coupled to a transmit antenna. A reset signal is generated to allow two more RF bursts to be produced.

The invention thus provides an ultra-wideband (UWB) transmitter that is useful for UWB communications, e.g. in a system with a delay and multiply receiver. The system is relatively high power, e.g. 40-50 V. The transmitter generates a pair of precisely spaced, same starting phase RF bursts. In an illustrative embodiment, 1.5 GHz RF bursts of 10 ns duration spaced 30 ns apart are generated. FIGS. 6A-6G show exemplary schematics of an embodiment of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An ultra-wideband (UWB) dual burst transmitter, comprising:
    a trigger pulse initiation circuit actuated by a single input trigger pulse;
    an initial trigger pulse generator connected to the trigger pulse initiation circuit to generate a first trigger pulse;
    a delayed trigger pulse generator connected to the trigger pulse initiation circuit to generate a second trigger pulse at a selected delay from the first trigger pulse;
    a bias driver connected to the initial and delayed trigger pulse generators; and
    a RF burst oscillator connected to the bias driver and actuated thereby in response to the first and second trigger pulses to generate a pair of RF bursts separated by the selected delay.

2. The transmitter of claim 1, wherein the RF burst oscillator is a GHz frequency oscillator.

3. The transmitter of claim 1, wherein the trigger pulse initiation circuit comprises a flip-flop, wherein the flip-flop provides an actuation signal to the initial and delayed trigger pulse generators upon receiving an input trigger pulse.

4. The transmitter of claim 3, wherein the flip-flop comprises a D flip-flop having its D input connected to an input enable signal, its clock input connected to a trigger signal, and its Q output connected to the initial and delayed trigger pulse generators.

5. The transmitter of claim 4, wherein the flip-flop reset input is connected to the delayed trigger pulse generator to reset the flip-flop after generation of the second trigger pulse.

6. The transmitter of claim 1, wherein the initial trigger pulse generator comprises in series an input RC delay circuit, a first inverter, a differentiator, a second inverter, and a diode.

7. The transmitter of claim 6, wherein the delayed trigger pulse generator comprises in series an input RC delay circuit, a first inverter, a differentiator, a second inverter, and a diode.

8. The transmitter of claim 7, wherein the RC time constant of the input RC delay circuit of the initial trigger pulse generator is small compared to the RC time constant of the input RC delay circuit of the delayed trigger pulse generator.

9. The transmitter of claim 8, wherein the input RC delay circuit of the initial trigger pulse generator comprises a variable resistor, which is adjustable to fine tune the delay between the first and second trigger pulses.

10. The transmitter of claim 9, wherein the inverters in the initial and delayed trigger pulse generators are CMOS inverters.

11. The transmitter of claim 7, wherein the trigger pulse initiation circuit comprises a flip-flop, and further comprising an RC delay circuit connected to the reset input of the flip-flop, wherein the output of the first inverter in the delayed trigger pulse generator is connected to the reset input through the RC delay circuit.

12. The transmitter of claim 1, wherein the RF burst oscillator comprises a RF power transistor, and a Clapp oscillator output stage connected to the output power transistor.

13. The transmitter of claim 12, wherein the RF power transistor is a MESFET having its gate connected to the bias driver and its source to the Clapp oscillator output stage.

14. The transmitter of claim 1, wherein the RF burst oscillator comprises a MESFET having its gate connected to the bias driver; a first capacitor connected from the MESFET gate to ground; a second capacitor, a first inductor, and a second inductor connected in series from the MESFET gate to a voltage supply; the MESFET drain being connected to ground; the MESFET source being connected through the third inductor to the voltage source; a third capacitor connected from the MESFET source to ground, and a fourth capacitor connected from the MESFET source to the RF output.

15. The transmitter of claim 14, wherein the capacitors and inductors are selected to select the RF frequency.

16. The transmitter of claim 1, wherein the bias driver comprises means for gating the RF burst oscillator on and off, means for level shifting the first and second trigger pulses from the initial and delayed trigger pulse generators for input into the RF burst oscillator and means for setting the length of the RF burst.

17. The transmitter of claim 1, wherein the bias driver comprises an inverter, a differentiator connected to the output of the inverter, a parallel pair of level shifted inverters connected to the differentiator, and a buffer inductor connected to the outputs of the inverters.

18. The transmitter of claim 17, further comprising a zener diode connected from a power input of a first of the pair of inverters to the power input of the second of the pair of inverters, and a resistor connected from the power input of the second inverter to ground, the power input of the first inverter being connected to a power source.

19. The transmitter of claim 1, further comprising a transmit antenna connected to the output of the RF burst oscillator.

20. A method of generating a precisely spaced pair of ultra-wideband (UWB) RF bursts, each starting with the same phase, from a single input trigger pulse, comprising:
generating an actuation signal from the input trigger pulse; passing the actuation signal through two trigger pulse generating paths to produce an initial trigger pulse and a delayed trigger pulse separated by a selected delay from the initial trigger pulse; and
driving an oscillator with the initial and delayed trigger pulses to produce a spaced pair of RF bursts, the RF bursts being separated by the selected delay.

21. The method of claim 20, wherein the oscillator produces RF bursts with a frequency in the GHz range.

22. The method of claim 20, further comprising conditioning the initial and delayed trigger pulses before driving the oscillator.

23. The method of claim 20, further comprising coupling the RF bursts to a transmit antenna.

24. The method of claim 20, further comprising generating a reset signal to allow another actuation signal to be generated.

* * * * *